United States Patent
Wu

(10) Patent No.: US 11,678,391 B2
(45) Date of Patent: Jun. 13, 2023

(54) COMMUNICATION METHODS AND ELECTRONIC DEVICES

(71) Applicant: BEIJING XIAOMI MOBILE SOFTWARE CO., LTD., Beijing (CN)

(72) Inventor: Zhe Wu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 190 days.

(21) Appl. No.: 17/209,798

(22) Filed: Mar. 23, 2021

(65) Prior Publication Data
US 2021/0410213 A1 Dec. 30, 2021

(30) Foreign Application Priority Data
Jun. 30, 2020 (CN) .......................... 202010622360.0

(51) Int. Cl.
H04W 4/00 (2018.01)
H04W 76/14 (2018.01)
H04B 17/318 (2015.01)
H04W 48/16 (2009.01)
H04W 72/30 (2023.01)

(52) U.S. Cl.
CPC .......... *H04W 76/14* (2018.02); *H04B 17/318* (2015.01); *H04W 48/16* (2013.01); *H04W 72/30* (2023.01)

(58) Field of Classification Search
CPC ... H04W 76/14; H04W 48/16; H04W 72/005; H04W 72/00; H04W 72/16; H04B 17/318
USPC ......................................................... 370/329
See application file for complete search history.

(56) References Cited

U.S. PATENT DOCUMENTS

| 10,063,804 B2* | 8/2018 | Yang ................ H04N 21/42204 |
| 10,595,191 B1* | 3/2020 | Mueller ................ H04W 36/32 |
| 2006/0072525 A1 | 4/2006 | Hillyard et al. |
| 2013/0252557 A1 | 9/2013 | Hillyard et al. |

(Continued)

FOREIGN PATENT DOCUMENTS

| CN | 105610469 A | 5/2016 |
| CN | 105830370 A | 8/2016 |

(Continued)

OTHER PUBLICATIONS

First Office Action of the Chinese Application No. 202010622360.0, dated Apr. 6, 2022 with English translation, (18p).

(Continued)

*Primary Examiner* — Marceau Milord
(74) *Attorney, Agent, or Firm* — Arch & Lake LLP

(57) ABSTRACT

A communication method is provided, which includes that: in response to detecting a first signal of a second device, a first device determines a signal strength between the first device and the second device; and in response to that the signal strength reaches a preset signal strength threshold, the first device establishes a connection with the second device. Another communication method is also provided, which includes that: a second device broadcasts a first signal; and the second device establishes a connection with a first device in response to a connection request triggered by that a signal strength between the first device and the second device reaches a preset signal strength threshold.

10 Claims, 4 Drawing Sheets

(56) References Cited

U.S. PATENT DOCUMENTS

| | | | |
|---|---|---|---|
| 2014/0222855 A1* | 8/2014 | Lucero | G06F 16/27 |
| | | | 707/769 |
| 2015/0080030 A1* | 3/2015 | Moldavsky | H04W 4/80 |
| | | | 455/456.3 |
| 2015/0099550 A1* | 4/2015 | Alharayeri | H04W 76/00 |
| | | | 455/456.3 |
| 2015/0172934 A1 | 6/2015 | Engelien-Lopes | |
| 2015/0296553 A1 | 10/2015 | DeFranco et al. | |
| 2016/0094934 A1* | 3/2016 | Yang | H04W 8/005 |
| | | | 455/41.2 |
| 2016/0286474 A1* | 9/2016 | Panwar | H04W 48/16 |
| 2016/0296553 A1* | 10/2016 | Quinn | A61P 25/22 |
| 2017/0064490 A1* | 3/2017 | Jin | H04W 4/80 |
| 2020/0051458 A1* | 2/2020 | Austin | B25J 9/08 |
| 2021/0044680 A1* | 2/2021 | Kang | H04W 4/80 |
| 2021/0044990 A1* | 2/2021 | Khawand | H04B 7/0689 |
| 2021/0352579 A1* | 11/2021 | Moreman | H04W 16/26 |

FOREIGN PATENT DOCUMENTS

| | | |
|---|---|---|
| CN | 105940720 A | 9/2016 |
| CN | 106658359 A | 5/2017 |
| CN | 107105005 A | 8/2017 |
| CN | 111201551 A | 5/2020 |
| CN | 105828281 B | 6/2020 |
| CN | 111246398 A | 6/2020 |
| JP | 2019080089 A | 5/2019 |

OTHER PUBLICATIONS

Partial Supplementary European Search Report in the European Application No. 21165144.3, dated Aug. 31, 2021, (14p).

* cited by examiner

COMMUNICATION METHODS AND ELECTRONIC DEVICES

CROSS-REFERENCE TO RELATED APPLICATION

This application claims the priority to Chinese Patent Application No. 202010622360.0, filed on Jun. 30, 2020, the contents of which are incorporated herein by reference in their entirety for all purposes.

TECHNICAL FIELD

The present disclosure generally relates, but is not limited, to the technical field of wireless communications, and more particularly, to communication methods and electronic devices.

BACKGROUND

With the continuous development of Bluetooth (BT) technology, the BT technology has been widely applied in the technical field of wireless communications. Sometimes, for establishment of a BT connection between a BT device A and a BT device B, an implementation manner is relatively complex and not so intelligent, and customer experiences are influenced; or, both the BT device A and the BT device B are required to be provided with Near Field Communication (NFC) chips, which greatly increases hardware cost of the BT connection.

SUMMARY

The present disclosure provides communication methods and electronic devices.

According to a first aspect of examples of the present disclosure, a communication method is provided, which is applied to a first device and includes that:

in response to detecting a first signal of a second device, a signal strength between the first device and the second device is determined; and in response to that a signal strength reaches a preset signal strength threshold, establishment of a connection with the second device is triggered.

According to a second aspect of the examples of the present disclosure, an electronic device is provided, which includes:

a processor; and a memory storing instructions executable by the processor, the processor is configured to run the executable instruction to:

in response to detecting a first signal of a second device, determine a signal strength between the first device and the second device; and in response to that a signal strength reaches a preset signal strength threshold, trigger establishment of a connection with the second device.

According to a third aspect of the examples of the present disclosure, an electronic device is provided, which includes:

a processor; and a memory storing instructions executable by the processor, the processor is configured to run the executable instruction to:

broadcast a first signal; and in response to a connection request triggered by that a signal strength between a first device and the second device reaches a preset signal strength threshold, establish a connection with the first device.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
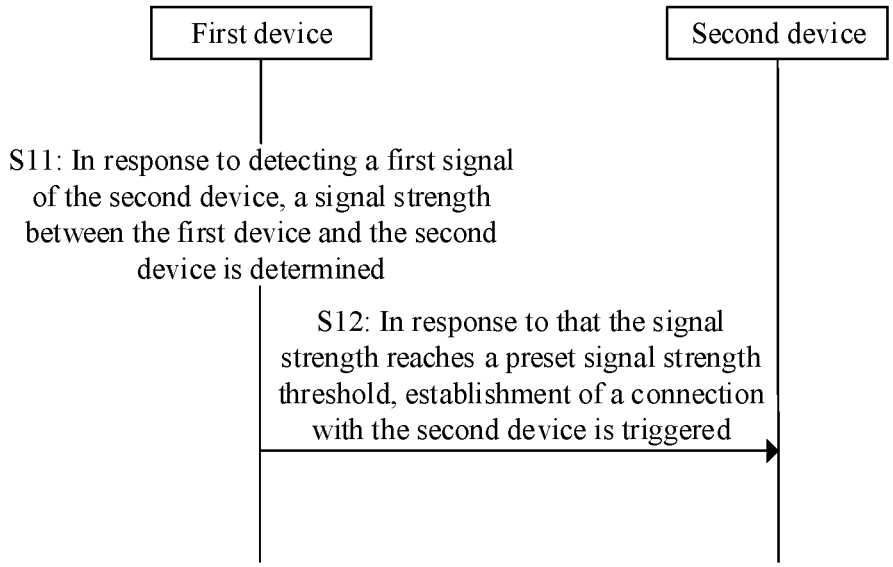
FIG. 1 is a flowchart of a communication method according to an example.

FIG. 1 is a flowchart of a communication method according to an example. As illustrated in FIG. 1, the method includes the following operations.

In S11, in response to detecting a first signal of a second device, a signal strength between a first device and the second device is determined.

In S12, in response to that the signal strength reaches a preset signal strength threshold, establishment of a connection with the second device is triggered.

In the example of the present disclosure, both the first device and the second device are mobile devices or fixed devices. For example, the first device and the second device are mobile phones, computers, servers, tablet computers and the like, or, the first device and the second device may also be wearable devices.

For example, the first device is a mobile phone, and the second device is a sound box. For another example, the first device is a mobile phone, and the second device is a mobile phone. For yet another example, the first device is a notebook computer, and the second device is a wearable watch.

Here, the connection established between the first device and the second device may be a BT connection or may also be a wireless network connection. For example, the wireless network connection may be an Ultra Wide Band (UWB) wireless carrier connection.

In an example, both the first device and the second device may be in a Bluetooth Low Energy (BLE) state. The BLE state includes at least one of a BLE scanning state or a BLE advertising state. Here, the first device may scan for BLE signal, and the second device may advertise BLE signal.

For example, in an application scenario, in S11, the first device scans the first signal from the second device during approaching the second device. In the example, the connection may be established for the first device and second device that get close to each other. Therefore, a connection delay may be greatly shortened.

In an example, the first device and the second device may be mutually triggered to establish the connection in the process of getting close to each other.

In some examples, the preset signal strength threshold is preset according to a signal strength between the first device and the second device when the first device is at a preset distance from the second device.

For example, when the first device and the second device are at the preset distance of the BT connection, a signal strength of the BT signal received by the first device from the second device is detected, or a signal strength of a BT signal received by the second device from the first device is detected, and the signal strength is pre-stored in the first device as the preset signal strength threshold.

Here, the preset distance is determined based on maximum transmission power of the BT signal of the first device. The BT signal is a kind of wireless signal and may be attenuated in a transmission process, so that an excessively long transmission distance may cause a receiving failure or poor receiving quality of a receiver. Therefore, the preset distance may be determined according to the maximum transmission power. For example, if a distance that the maximum transmission power of the BT signal of the first device reaches is maximally 10 meters, the preset distance may be 9 meters.

Here, the preset distance may be determined based on a configuration of a BT chip of the first device. If the BT chip of the first device is BT 5.1 and a configuration of BT 5.1 is that a transmission distance is 300 meters, the preset distance may be 300 meters.

In some other examples, the preset signal strength threshold is acquired from the first signal.

For example, the first device scans the first signal broadcast by the second device and acquires the preset signal strength threshold from the first signal.

Here, when the signal strength reaches the preset signal strength threshold, it indicates that a distance between the first device and the second device is within a preset distance range. In another example, when the signal strength does not reach the preset signal strength threshold, it indicates that the distance between the first device and the second device is out of the preset distance range.

Here, that the signal strength reaches the preset signal strength threshold may refer to that the signal strength is greater than or equal to the preset signal strength threshold.

In an example, the operation illustrated in block S12 includes that: in response to that the signal strength reaches the preset signal strength threshold, a BT connection with the second device is established based on BT address information of the second device carried in the first signal.

Here, the BT address information may be a BT address of the second device.

In the example of the present disclosure, when the signal strength between the first device and the second device reaches the preset signal strength threshold, the connection between the first device and the second device may be established automatically, so that the intelligence of an electronic device is improved.

In addition, in the examples of the present disclosure, the connection of the first device and the second device is established without any additional NFC chip and the like, so that the hardware cost in establishment of the connection may also be reduced.

In the example of the present disclosure, the connection between the first device and the second device is established automatically once the signal strength between the first device and the second device reaches the preset signal strength threshold, namely the connection can be established when the first device and the second device get close to each other, and reception of an additional instruction or execution of an additional operation for establishment of the connection is not required, so that the delay of establishment of the connection is shortened greatly, operations for establishment of the connection may be simplified, and the efficiency of establishing the connection may further be improved.

Moreover, if the connection established between the first device and the second device is a BT connection, since the BT connection may be established without any additional NFC chip, the hardware cost in establishment of the BT connection may also be reduced.

Figure 2:
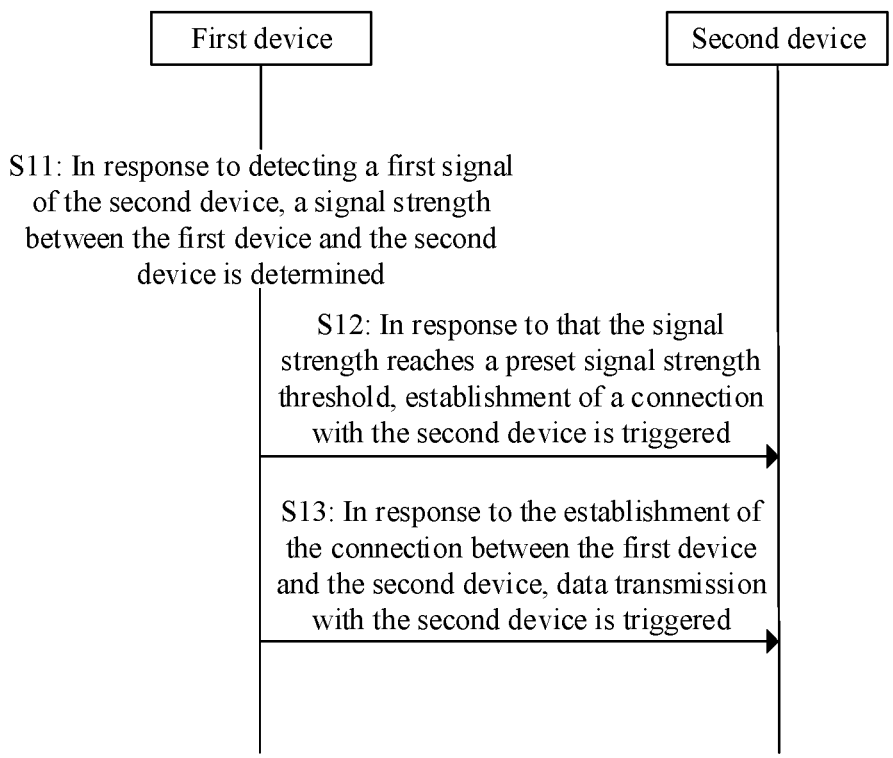
FIG. 2 is a flowchart of a communication method according to an example.

As illustrated in FIG. 2, in some examples, the method further includes the following operation.

In S13, in response to establishment of the connection between the first device and the second device, data transmission with the second device is triggered.

Here, the first device has established the connection with the second device.

Here, the operation that the first device performs data transmission with the second device includes at least one of the following operations:

the first device performs audio information transmission with the second device;

the first device performs video data transmission with the second device; and the first device performs text transmission with the second device.

In an example, the operation illustrated in S13 includes that:

in response to establishment of the BT connection between the first device and the second device, audio information transmission is performed with the second device.

Here, when the first device performs data transmission with the second device, the first device may trigger the second device to play audio information of the first device, or the second device may trigger the first device to play audio information of the second device.

For example, the first device is a mobile phone, the second device is a sound box, and the mobile phone establishes a connection with the sound box. The sound box may be triggered to play audio information of the mobile phone, or the mobile phone may be triggered to play audio information of the sound box.

Of course, in another example, the first device and the second device may be triggered to play or display texts, pictures or images, etc. based on the connection established between the first device and the second device.

In an example, the first device is a mobile phone, and the second device is a television. If the mobile phone establishes a connection with the television, the mobile phone may be triggered to play video data of the television, or the television may be triggered to play video data of the mobile phone.

In another example, the first device is a mobile phone, and the second device is a computer. If the mobile phone establishes a connection with the computer, the mobile phone may be triggered to display text information of the computer, or the computer may be triggered to display text information of the mobile phone, etc.

Of course, in another example, a control operation between the first device and the second device may be triggered based on the connection established between the first device and the second device.

For example, the first device is a router, and the second device is a smart home device such as a cleaning robot. If the router establishes a connection with the cleaning robot, the router may transmit a received control instruction to the cleaning robot to trigger the cleaning robot to work based on the control instruction.

In the example of the present disclosure, data transmission between the first device and the second device may be implemented automatically when the first device establishes the connection with the second device, so that convenience is brought to a user, and the experience satisfaction of the user is improved.

In an implementation, audio data is taken as an example, the first device may be a code stream transmitting device such as a mobile phone, the second device may be a code stream receiving device such as a sound box, and the second device transmits the first signal (such as a broadcast signal). The following scenario is considered: the first device moves closer to the second device and detects the first signal transmitted by the second device, signal strength of the first signal is continuously increased, when the signal strength of the first signal reaches the preset signal strength threshold, it indicates that the distance between the first device and the second device reaches the preset distance, and in such case, establishment of the connection between the first device and the second device is triggered. Since the first device scans and detects the first signal, the first device that performs signal detection may serve as a main device, namely the first device is determined as the code stream transmitting device and the second device is determined as the code stream receiving device, or negotiation may be performed in the process of establishing the connection to determine respective roles.

In another implementation, the first device may be a code stream receiving device such as a sound box, the second device may be a code stream transmitting device such as a mobile phone, the second device transmits the first signal (such as a broadcast signal), the sound box moves closer to the mobile phone and detects the first signal transmitted by the mobile phone, and when the signal strength of the first signal reaches the preset signal strength threshold, the connection is established therebetween. Since the sound box scans the signal of the mobile phone, the sound box should be a main device according to the strategy that a device that performs signal detection is a main device. However, the mobile phone is often required to serve as a main device. Therefore, they may determine the roles by role negotiation.

In some examples, the operation of establishing the connection with the second device includes that:

role negotiation is performed with the second device in a process of establishing the connection with the second device; and the operation that data transmission is performed with the second device includes that:

data transmission is performed with the second device according to a role as negotiated.

Here, the roles at least include a receiver role and a transmitter role.

For example, for audio information transmission, during audio information transmission, a device that transmits a code stream plays the transmitter role, and a device that receives the code stream plays the receiver role. If when a mobile phone establishes a connection with a BT earphone, the mobile phone usually plays the transmitter role and the BT earphone plays the receiver role.

In an example, the operation that data transmission is performed with the second device according to the role as negotiated includes that:

the second device is triggered to play audio information or video data of the first device according to a transmitter role obtained by negotiation; or, audio information or video data of the second device is played according to a receiver role obtained by negotiation.

For example, the first device is a mobile phone, and the second device is a sound box. If the role, obtained by negotiation, of the first device is the transmitter role, the mobile phone triggers the sound box to play audio information of the mobile phone. If the role, obtained by negotiation, of the first device is the receiver role, the mobile phone plays audio information of the sound box.

Here, when the first device and the second device perform role negotiation, the first device and the second device notify each other whether it supports data transmission or data reception. For example, if the first device is a mobile phone and the second device is a sound box, the mobile phone transmits information to the sound box to notify the sound box that it is required to transmit data, and the sound box transmits information to the mobile phone to notify the mobile phone that it is required to receive data. In such a manner, the respective roles of the first device and the second device may be determined.

In an application scenario, if the first device and the second device are peer devices, namely both the first device and the second device support data transmission or both the first device and the second device support data reception, the device that executes scanning may determine the respective roles of the first device and the second device when the first device and the second device execute role negotiation.

For example, in an example, the first device scans and receives the first signal from the second device, and during role negotiation, both the first device and the second device support data transmission, and the first device may determine that the first device plays the transmitter role and the second device plays the receiver role.

Accordingly, in the example of the present disclosure, whether to trigger the second device to play or display data of the first device or play or display data of the second device by the first device may be determined based on the role, obtained by negotiation, of the first device to ensure that, when the first device establishes the connection with the second device and one of them plays or displays data, the other also plays or displays the data. Therefore, the utilization rate of the connection or the BT connection is greatly increased, and data interaction conflicts therebetween may also be greatly reduced.

Figure 3:
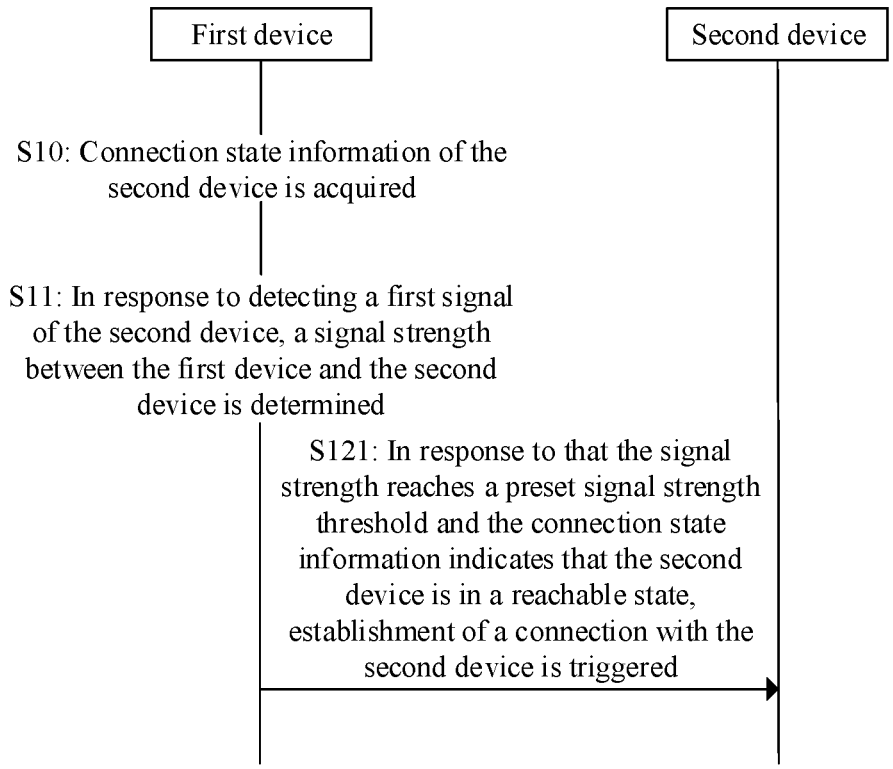
FIG. 3 is a flowchart of a communication method according to an example.

As illustrated in FIG. 3, the method further includes the following operation.

In S10, connection state information of the second device is acquired.

The operation illustrated in block S12 includes the following action.

In S121, in response to that the signal strength reaches the preset signal strength threshold and the connection state information indicates that the second device is in a reachable state, the connection is established with the second device.

In an example, the operation illustrated in block S10 includes that: the connection state information of the second device is acquired from the first signal. Here, the first signal carries the connection state information of the second device. Therefore, the connection state information of the second device may be acquired when one first signal is detected, signaling interactions may be reduced, thereby saving communication resources.

Of course, in another example, the connection state information may also be acquired from another signal transmitted by the second device in the BLE advertising state.

Here, the connection state information includes the reachable state or an unreachable state.

In an example, in the reachable state, the second device may establish the BT connection, and in the unreachable state, the second device refuses to establish the BT connection. For example, when a processing module (for example, an Application Processor (AP) or a Micro Controller Unit (MCU) and the like of the second device are in a dormant state, the second device is in the unreachable state.

In another example, the reachable state may be a state that the second device accepts establishment of the BT connection, and the unreachable state may be a state that the second device refuses to establish the BT connection. Therefore, the reachable state may be an accepting state, and the unreachable state may be a refusing state. In such case, if the AP of the second device may be in an awake state rather than the dormant state, but configuration information of the second device indicates refusing establishment of the BT connection, the second device is also in the unreachable state.

In the example of the present disclosure, when the signal strength between the first device and the second device reaches the preset signal strength threshold and the second device is in the reachable state, the connection with the second device may be established. Therefore, the connection may be established automatically without complex operations, the satisfaction of the user is improved, and meanwhile, the intelligence of the electronic device may be improved. Moreover, the BT connection between the first device and the second device may be established directly without other operations, so that the delay of establishment of the connection may be greatly reduced, and the efficiency of establishing the connection may be improved.

In some examples, the method further includes that:

in response to that the connection state information indicates that the second device is in an unreachable state, a second signal carrying a first instruction is transmitted to the second device, the first instruction instructing the second device to be switched from the unreachable state to the reachable state.

Here, that the second device is in the unreachable state may refer to that the second device has established a BT connection with a third device, or a BT function of the second device is not enabled, or the second device is in a BT connection refusing state, etc.

In an application scenario, if the BT function of the second device is not enabled, the first instruction is used for triggering the second device to enable the BT function such that the second device is in the reachable state.

In another application scenario, if the second device has established the BT connection with the third device, the first instruction is used for triggering the second device to disable the BT connection with the third device such that the second device is in the reachable state. In the application scenario, the second device supports establishment of a BT connection with only one BT device.

After the second device is recovered to the reachable state, the first device may establish the BT connection with the second device based on the BT address information of the second device.

Accordingly, in the example of the present disclosure, if the second device is in the unreachable state, the first instruction may be transmitted to the second device such that the second device in the reachable state for connection and the first device may establish the BT connection with the second device automatically.

Of course, in another example, the operation illustrated in block S11 may include the following action: in response to the detected first signal of the second device, receiving strength between the first device and the second device is determined.

The method further includes that: transmission strength of the first signal is acquired.

The operation illustrated in block S12 may include the following action: in response to that a difference between the transmission strength of the first signal and the receiving strength reaches a loss threshold, the connection is established with the second device.

Here, the difference between the transmission strength of the first signal and the receiving strength is a propagation loss, and that the difference between the transmission strength of the first signal and the receiving strength reaches the loss threshold refers to that the propagation loss of the first signal is less than or equal to the loss threshold.

Here, the propagation loss indicates the distance between the first device and the second device. The propagation loss is positively correlated with the distance between the first device and the second device. If the propagation loss is higher, the distance between the first device and the second device is longer, and if the propagation loss is lower, the distance between the first device and the second device is shorter.

Accordingly, in the example of the present disclosure, the connection may be established with the second device when the propagation loss between the transmission strength of the first signal and the receiving strength is less than the loss threshold, so that the connection may be established automatically, the delay of establishment of the connection may be shortened, and the intelligence of the electronic device may be improved. Moreover, in the example of the present disclosure, the propagation loss between the first device and the second device is relatively low, and user experiences may be improved based on data stability.

It is to be pointed out here that the following descriptions about a communication method are applied to a second device and correspond to the descriptions about the communication method applied to a first device. Technical details undisclosed in the example of the communication method applied to the second device in the present disclosure refer to the descriptions in the example of the communication method applied to the first device in the present disclosure and will not be elaborated herein.

Figure 4:
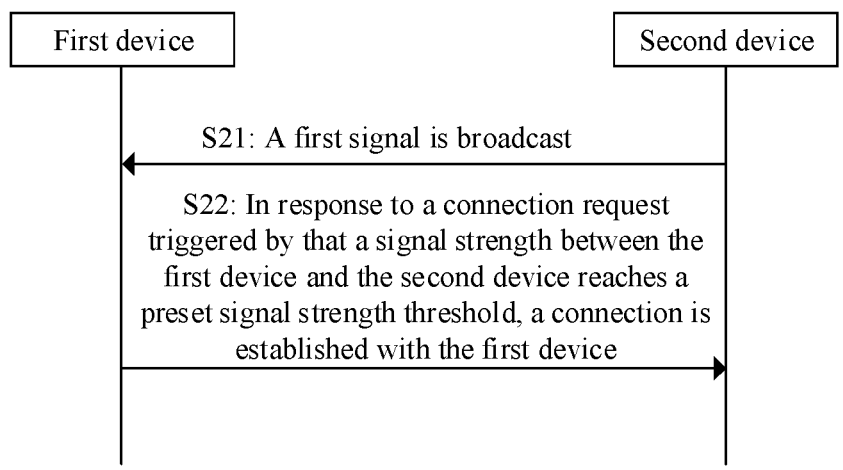
FIG. 4 is a flowchart of a communication method according to an example.

As illustrated in FIG. 4, a communication method is provided, which is applied to a second device and includes the following operations.

In S21, a first signal is broadcast.

In S22, in response to a connection request triggered by that signal strength between a first device and the second device reaches a preset signal strength threshold, a connection is established with the first device.

In the example of the present disclosure, when the signal strength between the first device and the second device reaches the preset signal strength threshold, the connection between the first device and the second device may be established automatically, so that the intelligence of an electronic device is improved.

In addition, in the example of the present disclosure, the connection between the first device and the second device is established automatically once the signal strength between the first device and the second device reaches the preset signal strength threshold, namely the connection may be established when the first device and the second device get close to each other, and reception of an additional instruction or execution of an additional operation for establishment of the connection is not required, so that a delay of establishment of the connection is shortened greatly, operations for establishment of the connection may be simplified, and the efficiency of establishing the connection may further be improved.

Moreover, if the connection established between the first device and the second device is a BT connection, since the BT connection may be established without any additional NFC chip, the hardware cost in establishment of the BT connection may also be reduced.

In some examples, the method further includes that:

in response to establishment of the connection between the first device and the second device, data transmission is performed with the first device.

In some examples, the operation that the connection is established with the first device includes that:

role negotiation is performed with the first device during establishing the connection with the first device; and the method further includes that:

data transmission is performed with the first device according to a role as negotiated.

In some examples, the preset signal strength threshold is preset according to a signal strength between the first device and the second device when the first device is at a preset distance from the second device.

In some examples, the first signal also carries connection state information of the second device.

The connection state information indicates that the second electronic device is in a reachable state or an unreachable state.

When the second electronic device is in the reachable state, the second electronic device may establish the BT connection; and when the second electronic device is in the unreachable state, the second device refuses establishment of the BT connection.

Figure 5:
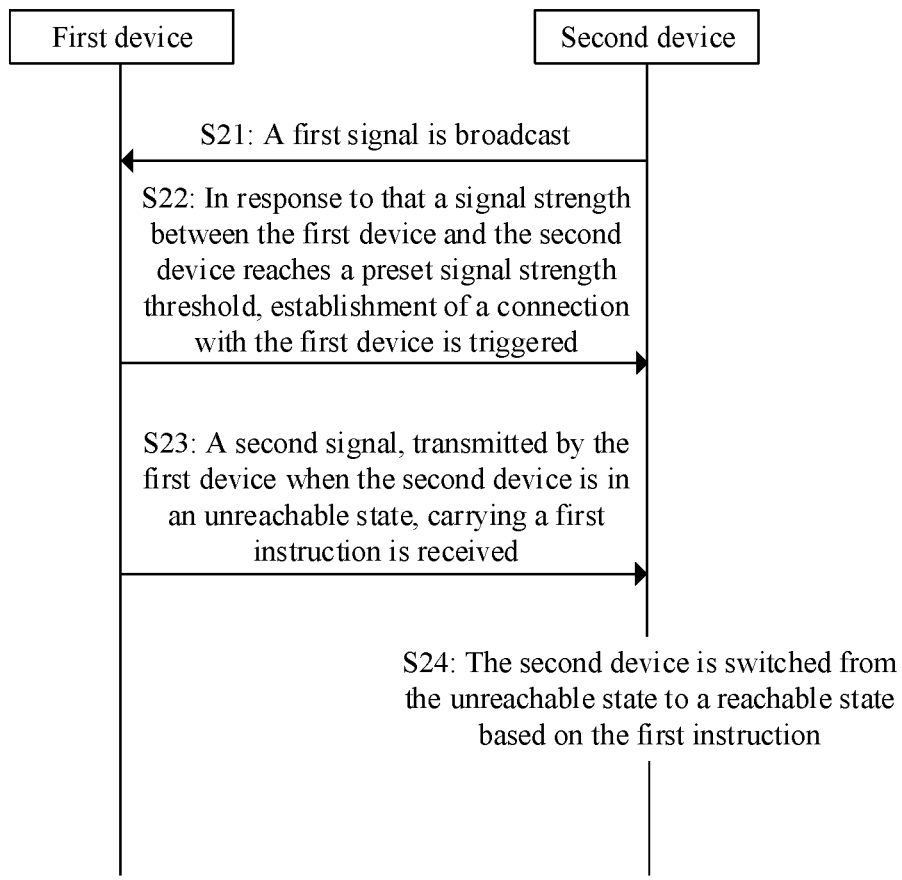
FIG. 5 is a flowchart of a communication method according to an example.

As illustrated in FIG. 5, in some examples, the method further includes the following operations.

In S23, a second signal, transmitted by the first device when the second device is in the unreachable state, carrying a first instruction is received.

In S24, the second device is switched from the unreachable state to the reachable state based on the first instruction.

If the connection is a BT connection, the second device is a device supporting establishment of a BT connection with one BT device, and may also be a device supporting establishment of BT connections with multiple BT devices.

In an example, the second device supports connection establishment with one BT device. When the signal strength between the first device and the second device reaches the preset signal strength threshold, if the second device has established a BT connection with a third device, the second device may disable the BT connection with the third device and establish the BT connection with the first device, or, a BT connection is determined to be established with the device corresponding to a high signal strength according to a signal strength between the second device and each of the first device and the third device.

In another example, the second device supports connection establishment with multiple BT devices. When the signal strength between the first device and the second device reaches the preset signal strength threshold, if the second device has established the BT connection with the third device, the second device may also establish the BT connection with the first device.

In the example, if the second device establishes the BT connections with the first device and the third device respectively, the second device preferentially performs data transmission with the first device.

Accordingly, in the example of the present disclosure, the second device may establish connections with multiple BT devices automatically or establish a connection with one BT device, and the intelligence of the electronic device may further be improved.

Figure 6:
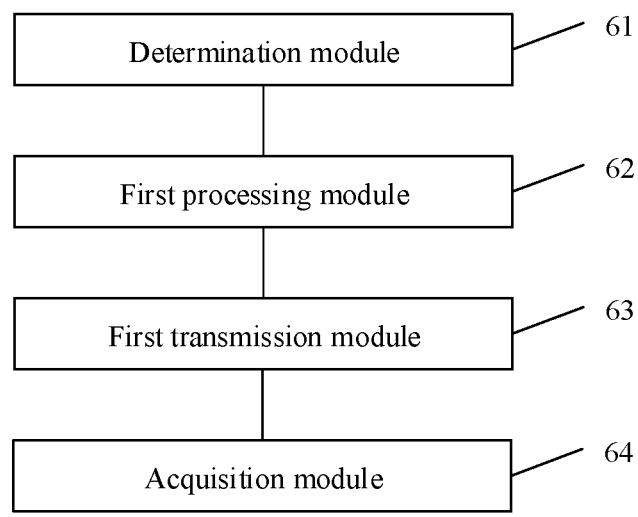
FIG. 6 is a block diagram of a communication apparatus according to an example.

As illustrated in FIG. 6, a communication apparatus is provided, which is applied to a first device and includes a determination module 61 and a first processing module 62.

The determination module 61 is configured to, in response to detecting a first signal of a second device, determine a signal strength between the first device and the second device.

The first processing module 62 is configured to, in response to that the signal strength reaches a preset signal strength threshold, trigger establishment of a connection with the second device.

In some examples, the apparatus further includes a first transmission module 63.

The first transmission module 63 is configured to, in response to establishment of the connection between the first device and the second device, trigger data transmission with the second device.

In some examples, the first processing module 62 is configured to perform role negotiation with the second device during establishing the connection with the second device; and the first transmission module 63 is configured to perform data transmission with the second device according to a role as negotiated.

In some examples, the preset signal strength threshold is preset according to a signal strength between the first device and the second device when the first device is at a preset distance from the second device.

In some examples, the apparatus further includes an acquisition module 64.

The acquisition module 64 is configured to acquire connection state information of the second device; and the first processing module 62 is configured to, in response to that the signal strength reaches the preset signal strength threshold and the connection state information indicates that the second device is in a reachable state, trigger establishment of the connection with the second device.

In some examples, the first transmission module 63 is configured to, in response to that the connection state information indicates that the second device is in an unreachable state, transmit a second signal carrying a first instruction to the second device, the first instruction instructing the second device to be switched from the unreachable state to the reachable state.

Figure 7:
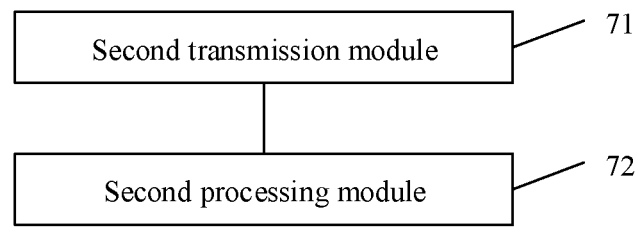
FIG. 7 is a block diagram of a communication apparatus according to an example.

As illustrated in FIG. 7, a communication apparatus is provided, which is applied to a second device and includes a second transmission module 71 and a second processing module 72.

The second transmission module 71 is configured to broadcast a first signal.

The second processing module 72 is configured to, in response to a connection request triggered by that a signal strength between a first device and the second device reaches a preset signal strength threshold, establish a connection with the first device.

In some examples, the second processing module 72 is configured to perform role negotiation with the first device during establishing the connection with the first device; and the second transmission module 71 is configured to perform data transmission with the first device according to a role as negotiated.

In some examples, the second processing module 72 is configured to, in response to establishment of the connection between the first device and the second device, perform data transmission with the first device.

In some examples, the preset signal strength threshold is preset according to signal strength between the first device and the second device when the first device is at a preset distance from the second device.

In some examples, the first signal also carries connection state information of the second device.

The connection state information indicates that the second electronic device is in a reachable state or an unreachable state.

When the second device is in the reachable state, the second electronic device may establish the BT connection; and when the second device is in the unreachable state, the second device refuses establishment of the BT connection.

In some examples, the second transmission module 71 is configured to receive a second signal, transmitted by the first device when the second device is in the unreachable state, carrying a first instruction; and the second processing module 71 is configured to switch the second device from the unreachable state to the reachable state based on the first instruction.

With respect to the apparatus in the above examples, the specific manner for the operation executed by each module has been described in detail in the examples related to the method, and is not elaborated herein.

The examples of the present disclosure also provide an electronic device, which includes:

a processor; and a memory configured to store one or more instructions executable by the processor, the processor being configured to run the executable instruction to perform the communication method of any example of the present disclosure.

Here, the electronic device may be the first device in the abovementioned examples or the second device in the abovementioned examples.

The memory may include any type of storage medium, and the storage medium is a non-transitory computer storage medium and may keep information in a communication device after a power failure of the communication device.

The processor may be connected with the memory through a bus and the like, and is configured to read an executable program stored in the memory to perform, for example, at least one of the methods illustrated in FIG. 1 to FIG. 5.

The examples of the present disclosure also provide a computer-readable storage medium having stored therein an executable program that, when executed by a processor, causes the processor to perform the communication method of any example of the present disclosure, for example, performing at least one of the methods illustrated in FIG. 1 and FIG. 5.

With respect to the apparatus in the above examples, the specific manner for the operation executed by each module has been described in detail in the examples related to the method, and is not elaborated herein.

Figure 8:
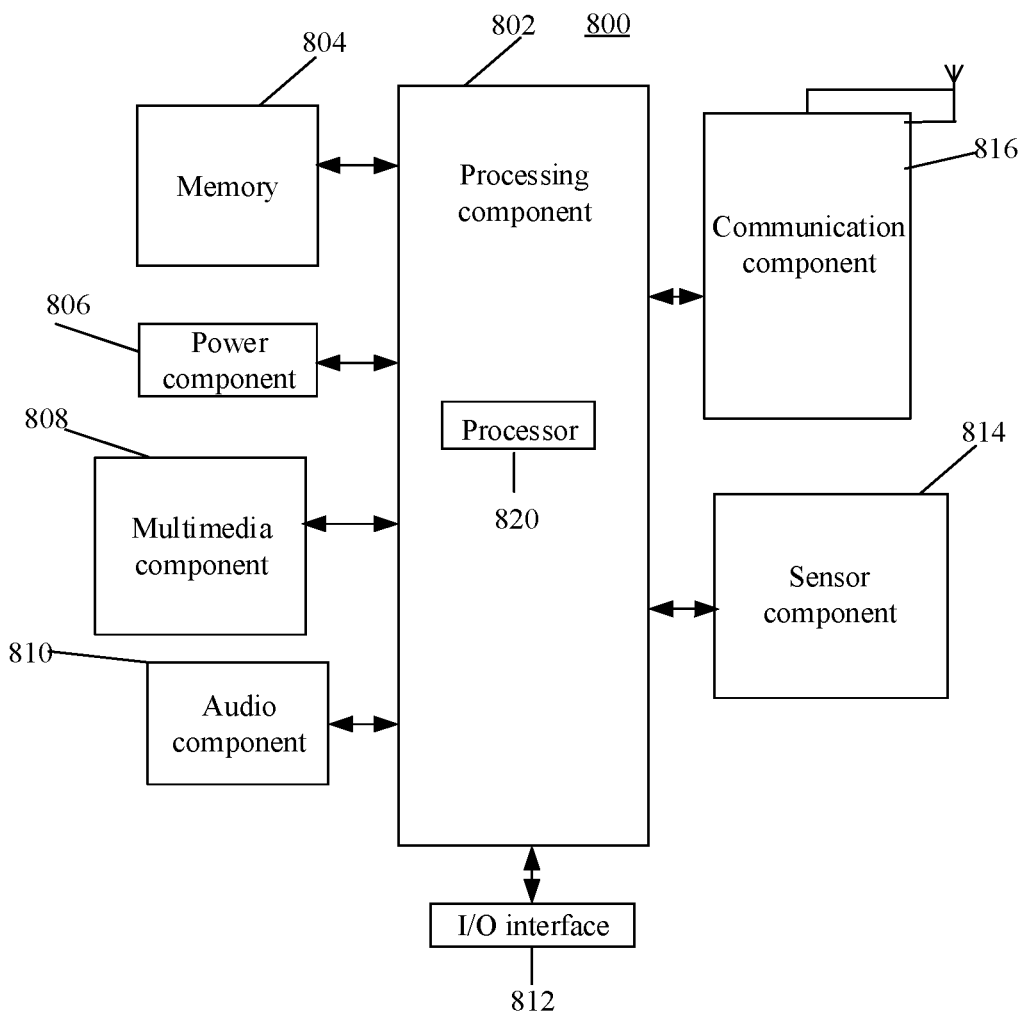
FIG. 8 is a block diagram of an electronic device according to an example.

FIG. 8 is a block diagram of an electronic device 800 according to an example. For example, the electronic device 800 may be a mobile phone, a computer, a digital broadcast terminal, a messaging device, a gaming console, a tablet, a medical device, exercise equipment, a personal digital assistant and the like.

Referring to FIG. 8, the electronic device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the electronic device 800, such as the operations associated with display, telephone calls, data communications, camera operations, and recording operations. The processing component 802 may include one or more processors 820 to execute instructions to perform all or part of the operations in the abovementioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the device 800. Examples of such data include instructions for any application programs or methods operated on the electronic device 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the electronic device 800. The power component 806 may include a power management system, one or more power supplies, and other components associated with generation, management and distribution of power for the electronic device 800.

The multimedia component 808 includes a screen providing an output interface between the electronic device 800 and a user. In some examples, the screen may include a Liquid Crystal Display (LCD) and a Touch Panel (TP). If the screen includes the TP, the screen may be implemented as a touch screen to receive an input signal from the user. The touch panel includes one or more touch sensors to sense touches, swipes and gestures on the touch panel. The touch sensors may not only sense a boundary of a touch or swipe action but also detect a duration and pressure associated with the touch or swipe action. In some examples, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the electronic device 800 is in the operation mode, such as a call mode, a recording mode and a voice recognition mode. The received audio signal may further be stored in the memory 804 or transmitted through the communication component 816. In some examples, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but is not limited to: a home button, a volume button, a starting button and a locking button.

The sensor component 814 includes one or more sensors configured to provide status assessment in various aspects for the electronic device 800. For instance, the sensor component 814 may detect an on/off status of the device 800 and relative positioning of components, such as a display and small keyboard of the electronic device 800, and the sensor component 814 may further detect a change in a position of the electronic device 800 or a component of the electronic device 800, presence or absence of contact between the user and the electronic device 800, orientation or acceleration/deceleration of the electronic device 800 and a change in temperature of the electronic device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some examples, the sensor component 814 may also include an acceleration sensor, a gyroscope sensor, a magnetic sensor, a pressure sensor or a temperature sensor.

The communication component 816 is configured to facilitate wired or wireless communication between the electronic device 800 and another device. The electronic device 800 may access a communication-standard-based wireless network, such as a Wireless Fidelity (WiFi) network, a 2nd-Generation (2G) or 3rd-Generation (3G) network or a combination thereof. In an example, the communication component 816 receives a broadcast signal or broadcast associated information from an external broadcast management system through a broadcast channel. In an example, the communication component 816 further includes an NFC module to facilitate short-range communication. For example, the NFC module may be implemented based on a Radio Frequency Identification (RFID) technology, an Infrared Data Association (IrDA) technology, a UWB technology, a BT technology and another technology.

In an example, the electronic device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an example, there is also provided a non-transitory computer-readable storage medium storing one or more instructions, such as the memory 804 including the one or more instructions, and the one or more instructions may be executed by the processor 820 of the electronic device 800 to perform the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other implementation solutions of the present disclosure will be apparent to those skilled in the art from consideration of the specification and practice of the present disclosure. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof

What is claimed is:

1. A communication method, applied to a first device, comprising:
   in response to detecting a first signal of a second device, determining a signal strength between the first device and the second device;
   acquiring connection state information of the second device;
   in response to that the signal strength reaches a preset signal strength threshold and the connection state information indicates that the second device is in a reachable state, triggering establishment of a connection with the second device; and
   in response to that the connection state information indicates that the second device is in an unreachable state, transmitting a second signal carrying a first instruction to the second device, wherein the first instruction instructs the second device to be switched from the unreachable state to the reachable state.

2. The method of claim 1, further comprising:
   in response to the establishment of the connection between the first device and the second device, triggering data transmission with the second device.

3. The method of claim 2, wherein establishing the connection with the second device comprises:
   performing role negotiation with the second device during establishing the connection with the second device; and
   performing data transmission with the second device comprises:
   performing data transmission with the second device according to a role as negotiated.

4. The method of claim 1, wherein the preset signal strength threshold is preset according to a signal strength between the first device and the second device when the first device is at a preset distance from the second device.

5. An electronic device, comprising:
   a processor; and
   a memory storing instructions executable by the processor,
   wherein the processor is configured to run the executable instructions to:
   in response to detecting a first signal of a second device, determine a signal strength between the first device and the second device;
   acquire connection state information of the second device;
   in response to that the signal strength reaches the preset signal strength threshold and the connection state information indicates that the second device is in a reachable state, trigger establishment of a connection with the second device; and
   in response to that the connection state information indicates that the second device is in an unreachable state, transmit a second signal carrying a first instruction to the second device, wherein the first instruction instructs the second device to be switched from the unreachable state to the reachable state.

6. The electronic device of claim 5, wherein the processor is further configured to run the executable instructions to:
   in response to the establishment of the connection between the first device and the second device, trigger data transmission with the second device.

7. The electronic device of claim 6, wherein the processor configured to establish the connection with the second device is further configured to:
   perform role negotiation with the second device during establishing the connection with the second device; and
   wherein the processor configured to perform data transmission with the second device is further configured to:
   perform data transmission with the second device according to a role as negotiated.

8. The electronic device of claim 5, wherein the preset signal strength threshold is preset according to a signal strength between the first device and the second device when the first device is at a preset distance from the second device.

9. An electronic device, comprising:
   a processor; and
   a memory storing instructions executable by the processor,
   wherein the processor is configured to run the executable instructions to:
   broadcast a first signal; and
   establish a connection with a first device in response to a connection request triggered by that a signal strength between the first device and the electronic device reaches a preset signal strength threshold and that a connection state information of the electronic device indicates that the electronic device is in a reachable state; and
   switch from a unreachable state to the reachable state, in response to receiving a second signal carrying a first instruction from the first device, wherein the first instruction instructs the electronic device to be switched from the unreachable state to the reachable state.

10. The electronic device of claim 9, wherein the processor configured to establish the connection with the first device is further configured to perform role negotiation with the first device during establishing the connection with the first device; and
    wherein the processor is further configured to run the executable instructions to perform data transmission with the first device according to a role as negotiated.

* * * * *